United States Patent [19]

Annehed et al.

[11] Patent Number: 5,575,884

[45] Date of Patent: Nov. 19, 1996

[54] ULTRASONIC PISTON CONVERTER

[75] Inventors: Stefan Annehed, Palatine; Hisami Mitsuishi, Wheeling; Erik Schott, Buffalo Grove; Dean C. Skonieczny; Par J. Svensson, both of Palatine, all of Ill.

[73] Assignee: Tetra Laval Holdings & Finance S.A., Pully, Switzerland

[21] Appl. No.: 315,398

[22] Filed: Sep. 28, 1994

[51] Int. Cl.⁶ ........................................ B32B 31/16
[52] U.S. Cl. ............... 156/580.1; 156/73.1; 425/174.2; 264/442
[58] Field of Search .............. 156/73.1, 580.1, 156/580.2; 228/1.1, 112.1; 425/174.2; 264/23, 442, 444, 445

[56] References Cited

U.S. PATENT DOCUMENTS

| | | | |
|---|---|---|---|
| 3,586,589 | 6/1971 | Jugler | 156/580.1 |
| 3,612,385 | 10/1971 | Humpage | 228/1.1 |
| 3,863,826 | 2/1975 | Shoh | 156/580.1 |
| 4,803,827 | 12/1989 | Posey et al. | 53/167 |

*Primary Examiner*—James Sells
*Attorney, Agent, or Firm*—McAndrews, Held & Malloy, Ltd.; Patrick N. Burkhart

[57] ABSTRACT

An ultrasonic transducer assembly for hygienic ultrasonic sealing is disclosed. The assembly includes a hygienic ultrasonic sealing area and a non-hygienic area, separated by a barrier wall. The barrier wall has an opening which allows an ultrasonic converter to move back and forth ("reciprocate") through the opening. The ultrasonic converter is also vibrated at an ultrasonic frequency by machinery located in the non-hygienic area of the machine, and transmits those vibrations to the hygienic area of the machine. The converter has a null area at which the converter is vibrated substantially minimally and other areas which are much more vigorously vibrated. A generally cylindrical sealing surface is fixed with respect to the null area of the transducer. The sealing surface is wiped by a wiping seal mounted to the edge of the opening. These two parts may also be reversed. Other details of the anvils, ultrasonic transducers, their drives and assemblies, and other aspects of an ultrasonic gable carton sealing machine are also disclosed.

14 Claims, 17 Drawing Sheets

TOP SEAL CAM ACCELERATION PROFILE

TOP SEAL CAM VELOCITY PROFILE

BOTTOM SEALER CAM ACCELERATION PROFILE

BOTTOM SEALER CAM VELOCITY PROFILE

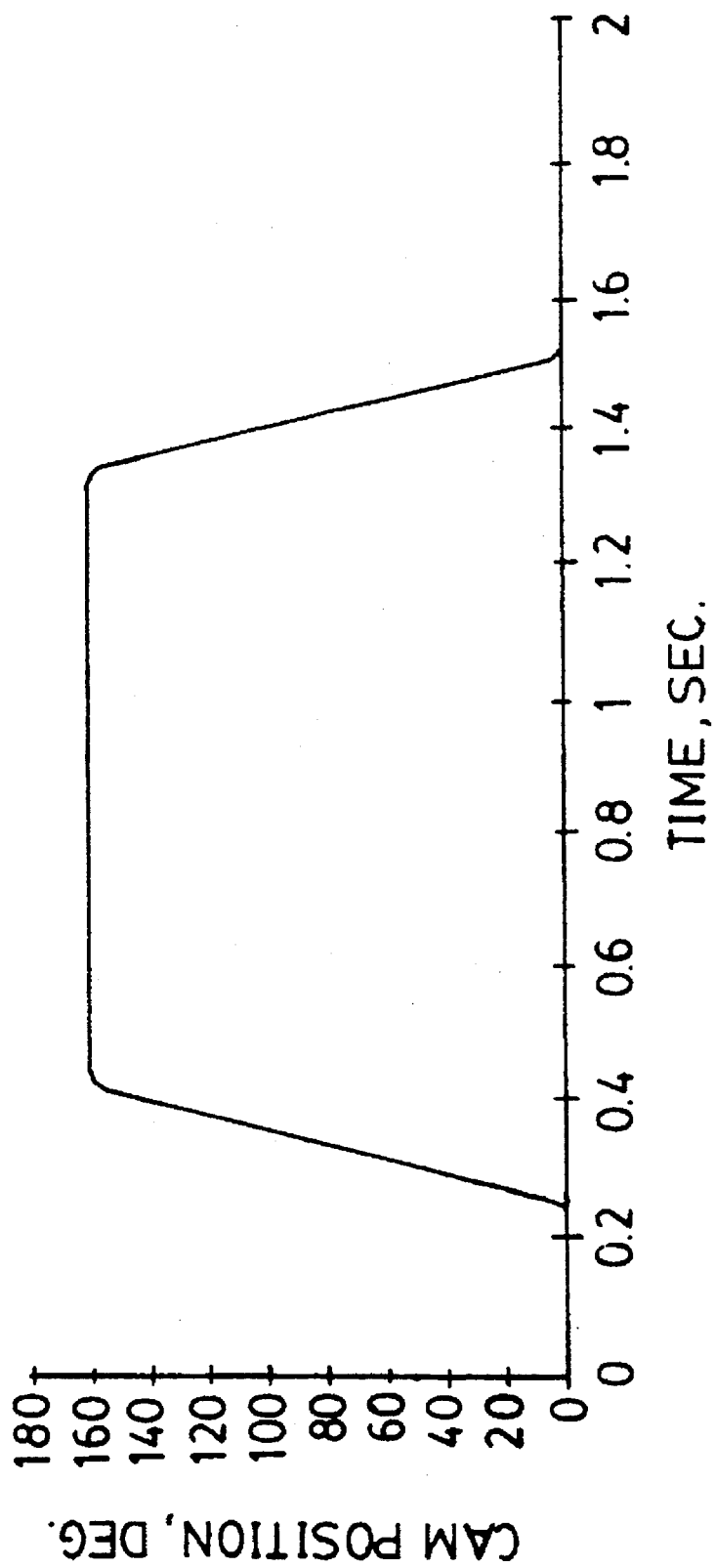
FIG. 17 BOTTOM SEALER CAM POSITION PROFILE

ULTRASONIC PISTON CONVERTER

TECHNICAL FIELD

The present invention relates generally to an ultrasonic sealing or welding machine for the hygienic joining of heat-sealable surfaces, and more particularly to such a machine having an arrangement for isolating the hygienic areas where a clean product (such as food) is exposed from non-hygienic areas where machinery is located.

BACKGROUND

Machinery for packaging food, pharmaceuticals, or other products which must be handled in a hygienic manner is well known. Typically, such machinery has certain parts, such as gears, motors, bearings, etc., which must be present to provide a working machine and yet should not be exposed to the product being hygienically packaged. Typically, these are moving machine elements which are difficult to clean. Commonly, it is also desirable to prevent contamination of the non-hygienic areas with the hygienic product. A barrier must be maintained between the hygienic and non-hygienic areas of the machine to address these goals.

The job of designing a suitable barrier is more complicated when the machine has moving parts which regularly move back and forth between the hygienic and non-hygienic areas (as is commonly the case). In that situation, the barrier between the hygienic and non-hygienic areas of the machine has included seals, collapsible bellows, or other elements to maintain isolation between the hygienic and non-hygienic areas along portions of the machinery passing through the barrier.

An even more difficult situation arises when ultrasonic energy is transmitted from a generator in the non-hygienic area of the machine into the hygienic area through a barrier between the respective areas. Simply providing a seal which wipes an ultrasonic transducer projecting through a barrier wall will not suffice: the ultrasonic energy carried by the transducer can damage the seal rapidly and breach the barrier. Other expedients, such as a bellows seal between moving pans, also may be damaged when one of the parts carries ultrasonic energy. A bellows seal exposed to the hygienic area is also difficult to keep clean or to inspect for integrity, and thus may be unsatisfactory for use in the hygienic area of a machine.

SUMMARY OF THE INVENTION

An ultrasonic transducer assembly for hygienic ultrasonic sealing is claimed. The assembly includes a hygienic sealing area which must be kept clean to protect exposed food and a non-hygienic area where food will not be exposed. These areas are separated by a barrier wall. The barrier wall has an opening which allows an ultrasonic converter to move back and forth ("reciprocate") through the opening.

The ultrasonic converter is vibrated at an ultrasonic frequency by machinery located in the non-hygienic area of the machine, and transmits those vibrations to the hygienic area of the machine. The converter has a null area at which the converter is vibrated substantially minimally and other areas which are much more vigorously vibrated.

A generally cylindrical sealing surface is fixed with respect to a first member. The first member may either be the edge of the hole through the barrier wall or the null area of the transducer. The sealing surface faces a second member which is the edge of the hole if the first member is the null area, or vice versa. A seal is mounted to the second member. The seal wipes the generally cylindrical sealing surface as the converter is moved back and forth.

One feature of the present machine is that only the null area of the transducer is in contact with the barrier, even though the null area moves with the transducer so it is not in a fixed location relative to the barrier. Very little ultrasonic energy is transmitted through the null area, so the barrier is largely isolated from the ultrasonic energy transmitted through it. Thus, the ultrasonic energy has little or no effect on the integrity of the barrier, Another feature of the present machine is that it is easy to clean, as no complex surfaces (such as the wall of a collapsible bellows conduit) are needed to maintain a barrier.

BRIEF DESCRIPTION OF THE DRAWINGS

FIGS. 15–17 are similar to FIGS. 12–14, showing the acceleration, velocity, and position of the cam drive for sealing the bottom seal of a gable-bottom carton.

DETAILED DESCRIPTION OF THE PREFERRED EMBODIMENT

While the one or more preferred embodiments will be described, it will be understood that the claims are not limited to those embodiments. On the contrary, the claims shall be interpreted to include all alternatives, modifications, and equivalents within their spirit and scope.

Figure 1:
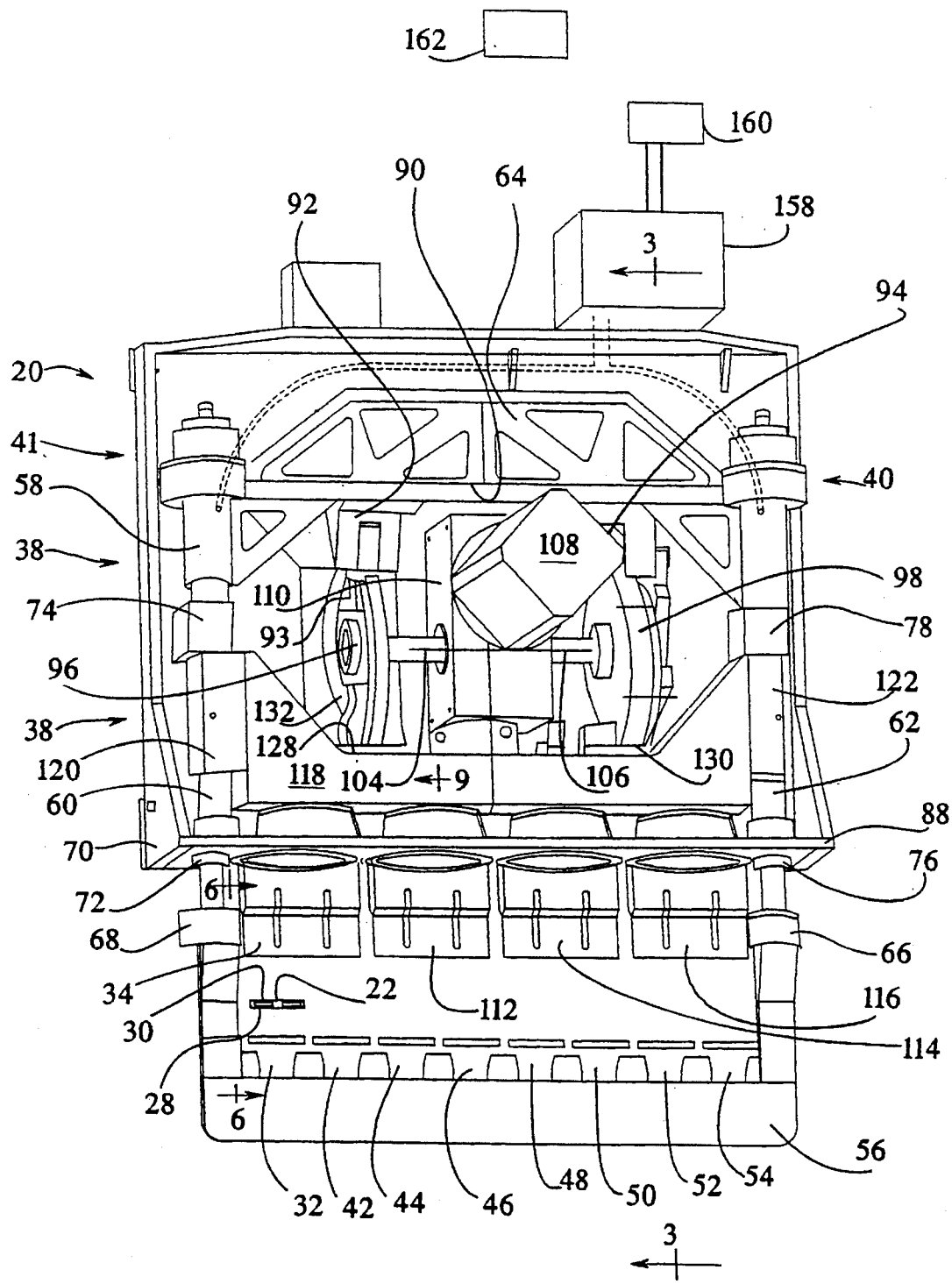
FIG. 1 is a perspective view of a carton sealing machine.

Referring first to FIG. 1, the canon sealer generally indicated at 20 is a module of a carton filling and sealing machine such as the one described in U.S. Ser. No. 08/190, 546, filed Feb. 2, 1994, U.S. Pat. No. 5,448,812 which is hereby incorporated by reference (the other parts of which are not shown). A filling and sealing machine of this kind includes two such modules, one for sealing the bottom fin 22 (shown in FIG. 2) of each carton such as 24 before it is filled, and the other for sealing the top fin of the canon 24 (which will be located at the fold line 26 shown in FIG. 2 after the top closure is folded shut). The top fin 26 is sealed after the canon is filled.

Each closure 22, 26 of the canon 24 has a first side 28 which faces the anvils such as 32 and a second side 30 which faces the ultrasonic sealing horns such as 34 when the canon 24, and more particularly a closure such as 22 of the canon 24, is located at a closure sealing position. A typical closure which can be sealed according to the present machine is a gable top or bottom closure for a food canon.

Figure 2:
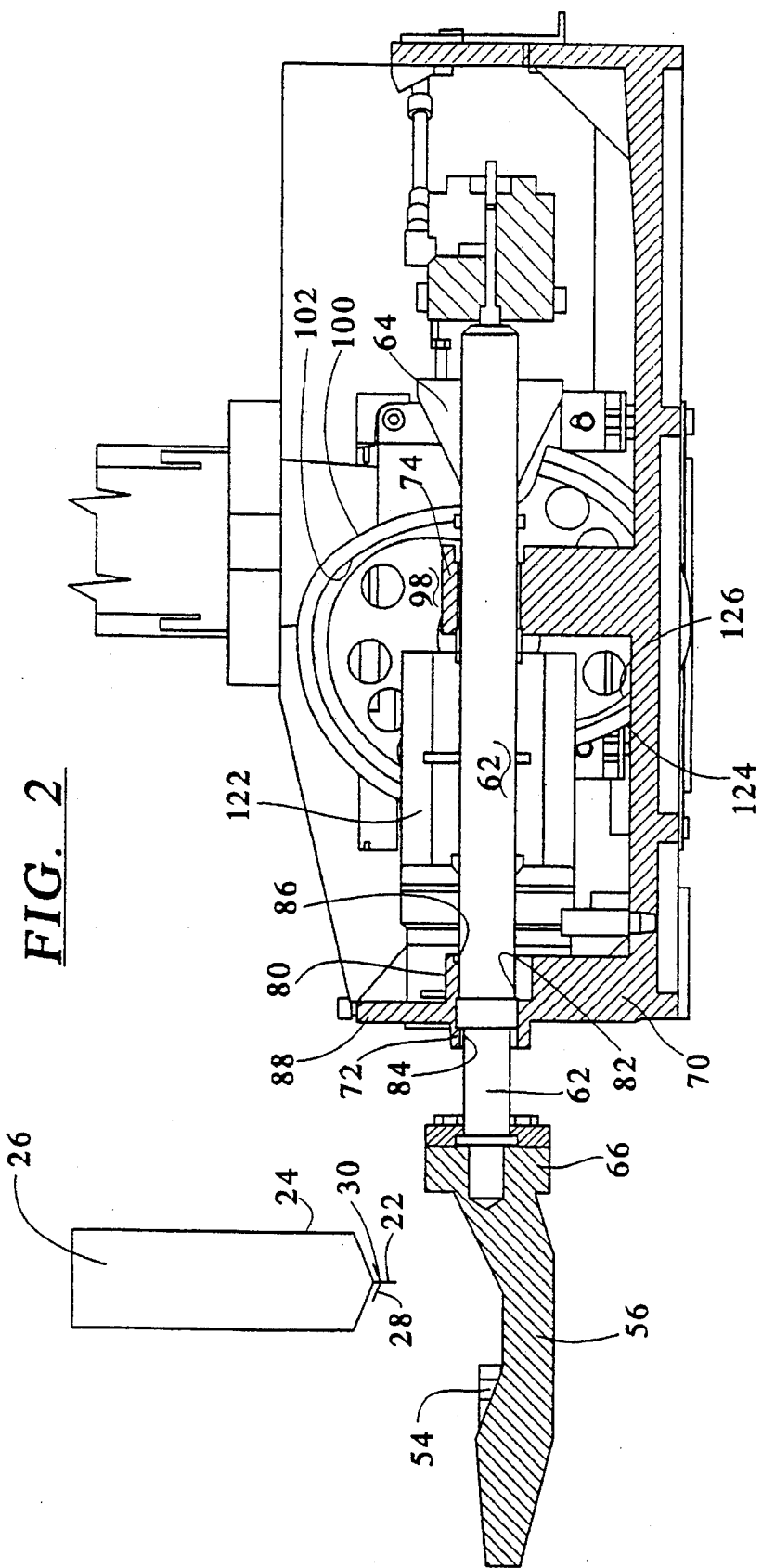
FIG. 2 is a side elevational view of the machine of FIG. 1, with some portions shown in section and other portions removed.
Figure 8:
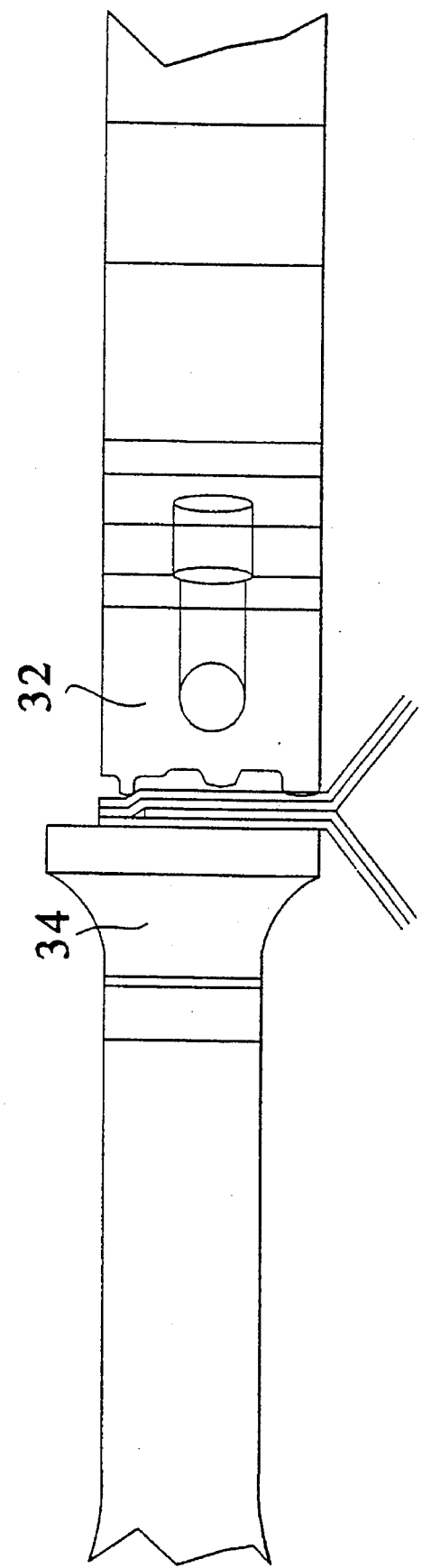
FIG. 8 is a view similar to FIG. 7, showing the anvil and sealing horn in their respectively closed positions, bearing against the gable closure.

Referring briefly to FIG. 2, the carton 24 is sealed according to the following sequence. First, the carton 20, which previously has been folded to substantially its final configuration by apparatus which is not illustrated here, is advanced, translating its bottom fin 22 from a position at which it is free of the carton sealer 20 to the closure sealing position. The bottom fin is then sealed by closing the anvil 32 and sealing horn 34 substantially together to clamp the closure 22, as also illustrated in FIG. 8. The sealing horn heats up the bottom fin 22, fusing its heatsealable elements together. The closure 22 is then unclamped. After the anvil 32 and sealing horn 34 are parted, the bottom fin 22 is translated in the reverse direction to disengage the carton 24 from the carton sealer 20, allowing the carton 24 to be advanced to the filler (not shown).

Major Sealer Elements

Now returning to FIG. 1, the sealer 20 which is one embodiment of the present machine includes an anvil 32, an ultrasonic sealing horn 34, an anvil drive generally indicated at 36, a horn drive generally indicated at 38, and biasing elements 40 and 41.

Anvil Assembly

In the illustrated embodiment, a series of eight anvils: 32 and 42–54—are provided, so eight cartons can be sealed at the same time with a single reciprocal stroke of the ganged anvils. The eight anvils 32 and 42–54 are mounted on an anvil bar 56. The anvil bar 56 is arranged for travelling back and forth reciprocally, reciprocating each anvil such as 32 back and forth between an open position (best shown in FIGS. 1 and 7) allowing a carton to pass and a closed position (best shown in FIG. 8) for bearing against the first side 28 of a closure (such as the bottom fin 22) located at the closure sealing position.

A rectangular anvil frame 58 is defined by the anvil bar 56, the pull rods 60 and 62, and a pull bar 64. The pull rods 60 and 62 are rigidly bolted to the feet 66 and 68 of the anvil bar 56. The details of the fastening in this embodiment are best seen in FIG. 2. The pull rods 60 and 62 are operatively connected to the pull bar 64 by the biasing elements 40 and 41. The details of that connection are provided below.

The pull rod 60 is supported for reciprocal travel with respect to the frame 70 of the carton sealer 20 by slide bearings 72 and 74 (which are prominent in FIG. 2), while the pull rod 62 is supported for reciprocal travel with respect to the frame 70 of the carton sealer 20 by slide bearings 76 and 78.

Referring to FIGS. 1 and 2, the slide bearings 72 and 76 can be identical. Each is defined by a bushing such as 80 which is integral with the frame 70 and has a generally cylindrical bore 82 capped at its respective ends by retaining rings 84 and 86. A slide ring 84 is fixed to the associated pull rod such as 62 and slidable between limits defined by the retaining rings 84 and 86 within the bore 82.

The retaining rings 84 and 86 of this embodiment are also wiping seals which help isolate the non-hygienic area generally to the right (in FIG. 2) of the isolation wall 88, where the drive machinery is located, from the hygienic area generally to the left of the isolation wall 88 where cartons are being filled and packaged. This expedient is desirable because the pull rods 60 and 62 reciprocate through the bushing 80. By providing seals on each end of the bore 82, successive reciprocations of the pull rods will not tend to advance lubricants or other foreign matter into or through the bores such as 82 from right to left (as shown in FIG. 2). It is also important to prevent foreign matter, such as spilled food or carton debris, from advancing from left to right, as shown in FIG. 2 into or through the bores such as 82. That goal is also accomplished by the illustrated embodiment.

In this embodiment, the slide beatings 74 and 78 are located entirely within the nonhygienic area to the fight of the isolation wall 88 of FIG. 2, and a second pair of retaining rings like 84 and 86 would be redundant. Thus, ordinary slide bearings 74 and 78 which lack wiping seals will suffice to keep the travel of the pull rods 60 and 62 accurately axial along the axes of the pull rods.

Anvil Drive

An anvil drive generally indicated at 36 is provided for moving the pull bar 64, and thus the anvil bar 56 and the attached anvils 32 and 42–54, back and forth between their respective open and closed positions.

The drive for advancing the anvils 32 and 42–54 to their closed positions acts on a generally horn-facing side of the anvil frame 58, and in this embodiment specifically acts on the horn-facing side 90 of the pull bar 64. The horn-facing side of the pull bar 64 has advancing cam followers, here rollers 92 and 93, and retracting cam followers, here rollers 94 and 95 (95 is shown mostly in phantom in FIG. 3) attached to it, which are driven by cams 96 and 98. Since the two cam drives are identical, only one will be described in detail. The cam 98 has an anvil-advancing surface 100 for moving the anvils toward their closed position and an anvil-retracting surface 102, best seen in FIGS. 2 and 3, for moving the anvils toward their open position.

The cams 96 and 98 are respectively rotatably mounted on pivots. Here, the cam shafts 104 and 106 (which alternately can be the respective ends of a single shaft) carded in rotation beatings (not shown) define those pivots. The cam shafts 104 and 106 are driven by a servo motor 108 via a gear train located within the gear box 110 for rotating the cams 96 and 98 about their pivots. The servo motor or the gear train can be used to vary the cam rotation rate at various points in its travel, relative to the cam surface profile, so the amount of torque required of the servo motor does not exceed its capacity, particularly where the change in cam radius is steep. The sealing profile of cam position, velocity, and acceleration can also be changed remotely as desired by changing the position, velocity, and acceleration profile of the servo motor. Typical profiles are discussed below in connection with FIGS. 12–17.

Figure 3:
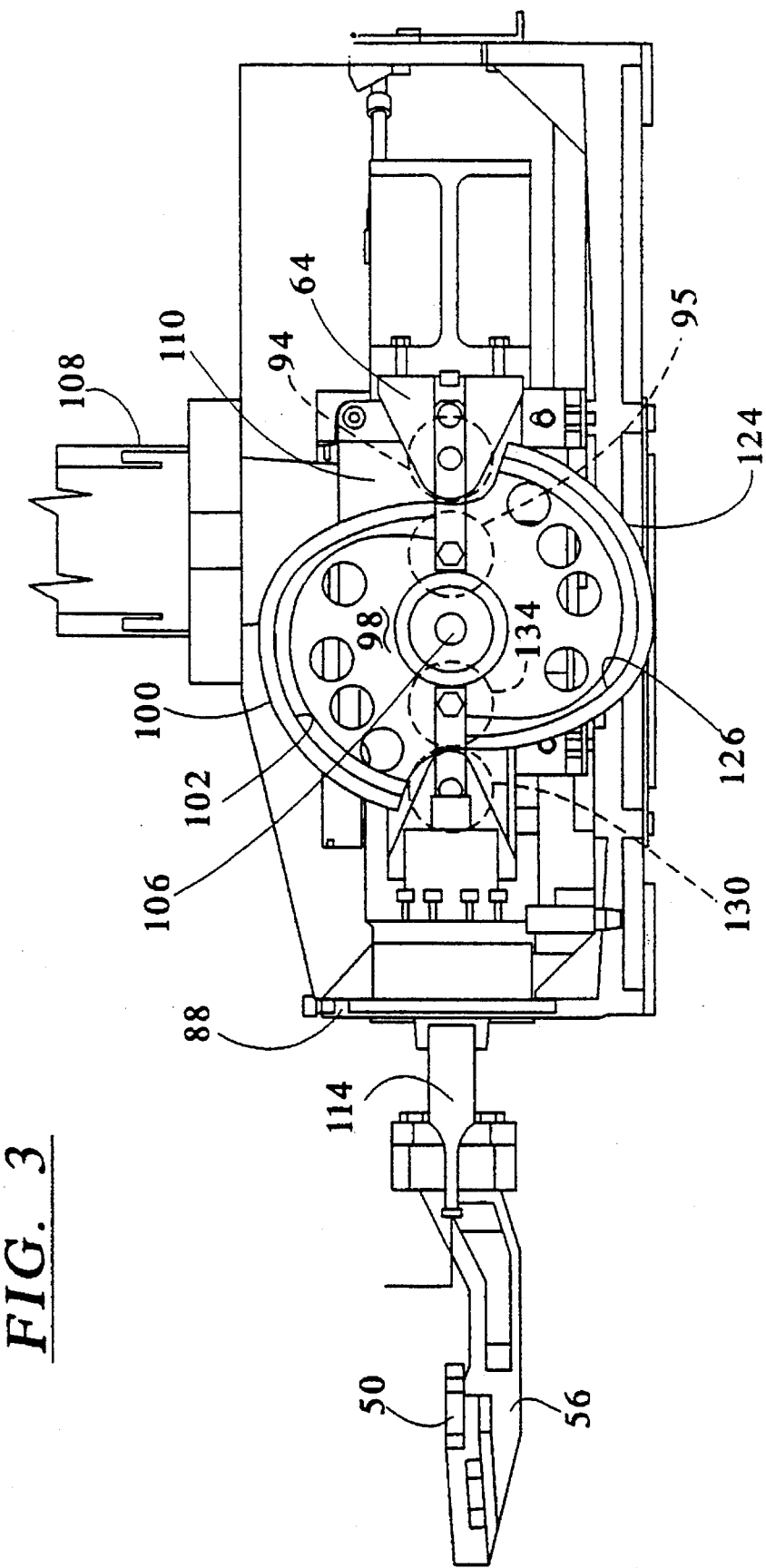
FIG. 3 is a side elevation taken from line 3—3 of FIG. 1, with overlying structure removed for clarity.

The cam 98 shown in FIGS. 2 and 3 is at its starting position at which the anvils 32 and 42–56 are in their fully open positions. The cam 98 is first driven clockwise about 160 degrees by the servo motor 108, so the radius of the portion of the cam surface 100 bearing upon the cam follower 94 generally increases. Referring to FIG. 1, that motion of the cam 98 pushes the cam follower 94, and thus the pull bar 64, the pull rods 60 and 62, and the anvil bar 56, upward toward their respective closed positions.

Then, when a seal is completed and the anvils 32 and 42–54 are to be retracted to their open position, the cam 98 is driven counterclockwise to its starting position. The anvil retracting surface 102 of the cam 98 bears against the cam follower 95, with the radius of the portion of the cam surface 102 contacted by the cam follower 95 generally decreasing. This counter-rotation of the cam 98 pulls the pull bar 64, the pull rods 60 and 62, and the anvil bar 56 downward (as shown in FIG. 1) toward their open positions.

Ultrasonic Horn Assembly

In the illustrated embodiment, a series of four ultrasonic sealing horns or transducers—34 and 112–116—are provided, each wide enough to bear against two anvils, so eight cartons can be sealed at the same time with a single reciprocal stroke of the ganged sealing horns. The four sealing horns 34 and 112–114 are mounted on a cradle 118.

The cradle 118 is arranged for travelling back and forth reciprocally between an open position (best shown in FIGS. 1 and 7) allowing a carton to pass and a closed position (best shown in FIG. 8) for bearing against the second side 30 of a closure (such as the bottom fin 22) located at the closure sealing position.

The cradle 118 has integral bushings 120 and 122 slidably received on the pull rods 60 and 62, defining slide bearings. This arrangement accurately locates the sealing horns and anvils relative to each other as they reciprocate. The ultrasonic stacks which terminate in the sealing horns 34, 112, 114, and 116 also include ultrasonic converters or transducers and ultrasonic generators, which are not shown. The ultrasonic stacks are mounted on the cradle 118 to locate, support, and drive them.

Ultrasonic Horn Drive

A cam-operated horn drive generally indicated at 38 is provided for moving the cradle 118 back and forth between its open position and its closed position. The cams 96 and 98 each have a horn-driving cam surface, such as the surface 124 shown in FIG. 2, and a horn-retracting cam surface, such as the surface 126 shown in FIG. 2. These cam surfaces are substantially opposed to, but approximately the same shape as, the anvil-driving and retracting surfaces, so the anvils and sealing horns move in opposition when the cams are rotated.

The cams 96 and 98 respectively drive cam followers 128 and 130, which are attached to the cradle 118 and follow the horn driving outer surfaces 124 of the cams 96 and 98. Thus, clockwise rotation of the cams 96 and 98 as described before generally increases the radius tracked by the cam followers 128 and 130, driving the cradle 118 and sealing horns 34 and 112–116 downward (as shown in FIG. 1) toward their closed position.

The cams 96 and 98 respectively drive cam followers 132 and 134, which are attached to the cradle 118 and follow the horn-retracting inner surfaces 126 of the cams. Thus, counter-clockwise rotation of the cams 96 and 98 as described before generally decreases the radius tracked by the cam followers 132 and 134, driving the cradle 118 and sealing horns 34 and 112–116 upward (as shown in FIG. 1) toward their open position.

One feature of the present machine is thus that both the anvil and the sealing horn are movable in coordination by the same cams, thus using the same acceleration, velocity, and position profiles, so that a closure located in the center of a carton can be engaged without moving the carton laterally. Neither the sealing horn nor the anvil will arrive early or late, as the two are driven in cooperation. Thus, the carton can be securely supported in such a manner that it is not movable laterally, as the carton position does not need to be adjusted to account for shifts in the closed position of the horns and anvils.

Another advantage of the illustrated arrangement is that the anvil drive and the horn drive are located on the same side of the sealing area, instead of on opposite sides. Thus, an isolation wall 88 is needed only on one side of the sealing area, so the sealing operation can readily be inspected from that side of the machine, while the operation of the non-hygienic part of the machine can be observed from the other side of the single isolation wall. The sealing apparatus, being all located in one area and employing multifunctional cams, also has a minimum width, which is desirable to minimize the width of the sealing line.

Biasing Element

The biasing element 40—which can be thought of as a cushion or spring—is connected between either the anvil or the horn and its drive (or between each of those elements and its drive, in an alternate embodiment). The biasing element limits the sealing pressure developed between the anvil and the horn to a predetermined maximum value. The predetermined value is the pressure exerted by the biasing element. This prevents the anvil and horn from gripping the closure too tightly and thus either damaging the closure or the sealing machine, and compensates for slight inaccuracies in position of the anvil or horn without increasing or decreasing the sealing force. The biasing force can also be adjusted remotely, without stopping the machine, by using an externally applied pneumatic force as the biasing element.

Figure 4:
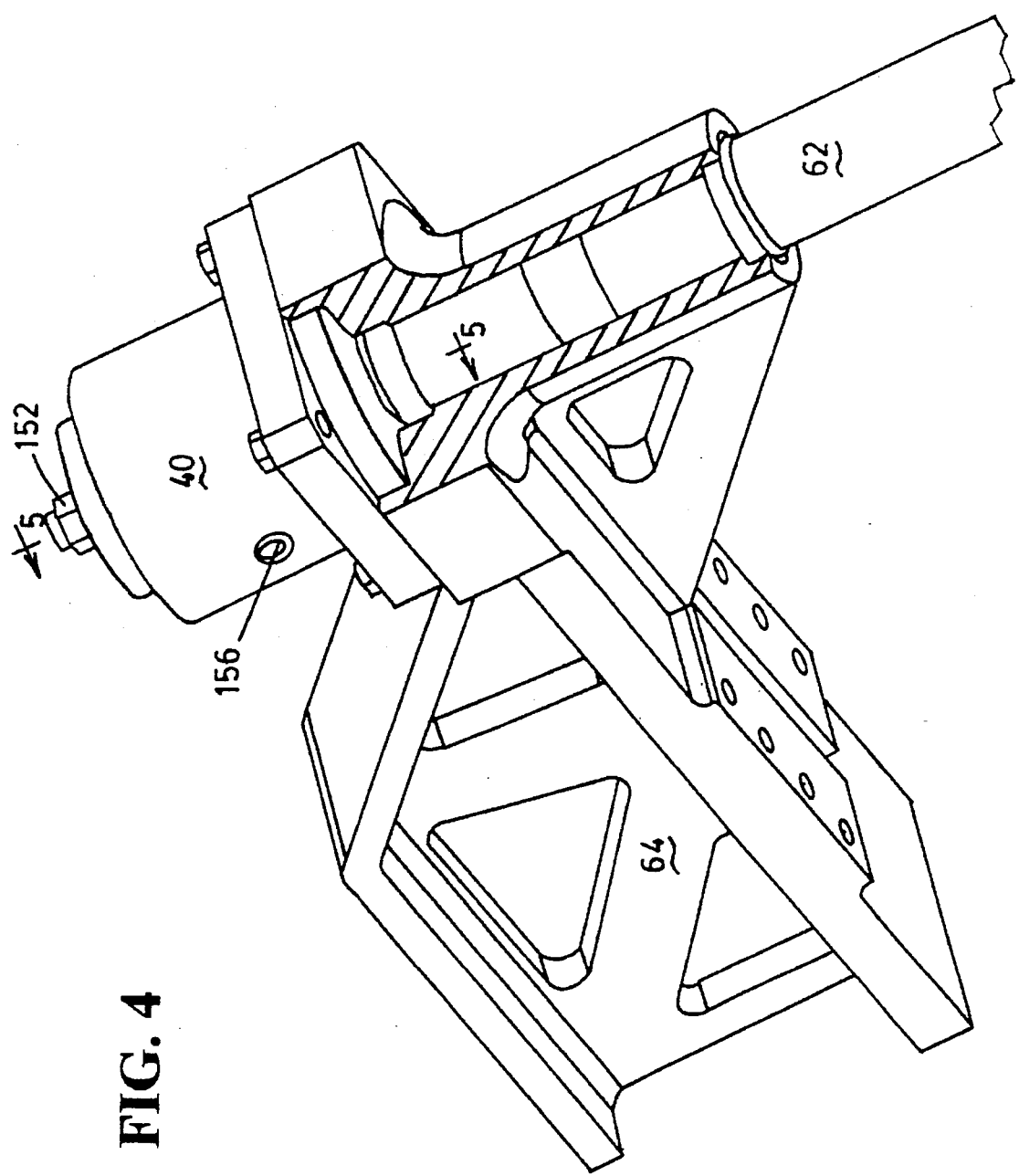
FIG. 4 is a fragmentary perspective detail view of the pull bar, pull rod, and pneumatic biasing element of the anvil drive assembly, with a portion broken away to reveal interior details of the biasing element.
Figure 5:
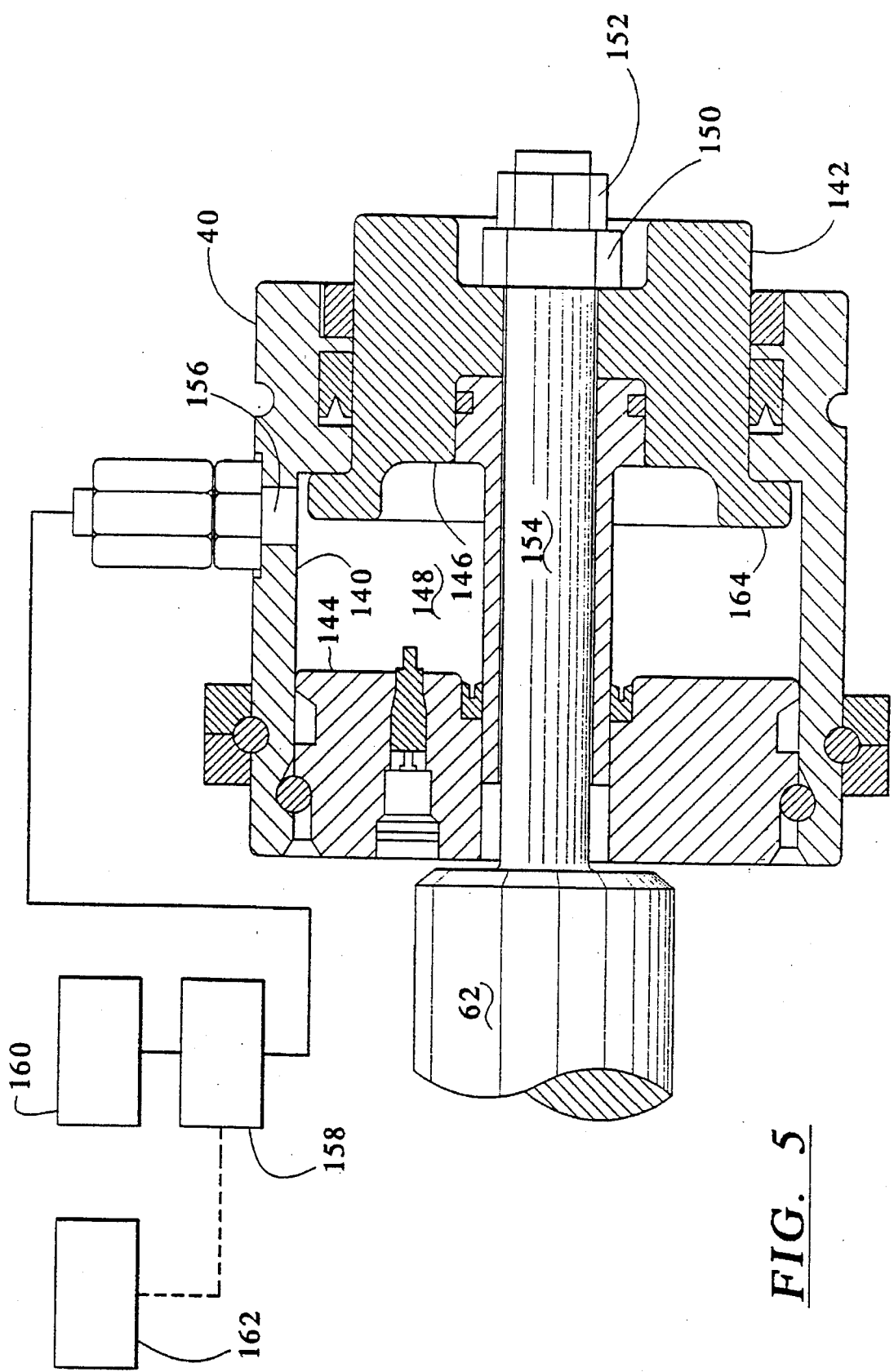
FIG. 5 is a partial section of the biasing element, taken along line 5—5 of FIG. 4.

In the present embodiment, the biasing elements 40 and 41 operatively connect the anvils such as 32 to their cam drive. Referring to FIGS. 4 and 5, the biasing elements 40 and 41 are identical pneumatic linkages. Springs or other resilient couplings could also be used, although pneumatic linkages have certain advantages which will be described below. For brevity, only the biasing element 40 will be described here.

The biasing element 40 comprises a bore 140 which receives a sliding piston 142. The annular cylinder and piston surfaces 144 and 146 and the bore 140 define a substantially closed space 148. The piston 142 is captured on the end of the pull rod 62 by nuts 150 and 152 threaded on the extension 154 of the pull rod 62. The bore 140 is formed in an integral part of the pull bar 64.

The space 148 is pressurized via a port 156 and a pressure regulator 158 with a source of pressurized gas 160. A remote control such as 162 can be used to change the pressure setpoint of the regulator 158, thus changing the pressure within the space 148. Gas pressure within the space 148 biases the piston surface 146 to the fight relative to the cylinder surface 144, so the piston floats above or ahead of the surface 144, thus biasing the pull rods 62 and the anvil bar 56 toward their respective closed positions.

The degree to which the piston 142 floats above the cylinder surface 144 can be controlled by capturing the piston 142. In the embodiment of FIG. 5, the flange 164 of the piston 142 captures the piston 142 within the cylinder bore 140.

When the pull bar 64 and the anvils such as 32 are at their closed positions, the carton closure being sealed is borne against by the anvils, holding the flange 164 off its stop. At this point, the gas cushion in the space 148 is the only force exerted by the anvil against the closure and the opposed sealing horn. This sealing force is the product of the gas pressure within the space 148 and the effective area of the surface 144. A specific force of about 15,000 N is contemplated in this embodiment, though more or less pressure may be desirable in given situations.

One advantage of the illustrated arrangement is that the sealing force exerted by the anvils 32 is reproducible, despite minor differences in thickness or resilience of the fins such as 22 (due, for example, to the occasional capture of small amounts of product within the folds of the fin 22). Another advantage is that, being equal to the gas pressure within the space 148, the anvil pressure can be changed by changing the gas pressure. The gas pressure can readily be changed remotely.

Still another advantage of the present arrangement can be realized by allowing communication between the respective spaces 148 of two or more biasing elements such as 40 and 41. This allows reliably identical biasing pressures to be exerted at all times by two biasing elements connected to the same pull rods 62 or other machine elements. Such communication is schematically illustrated in FIG. 1.

Ultrasonic Converter Seal

Figure 9:
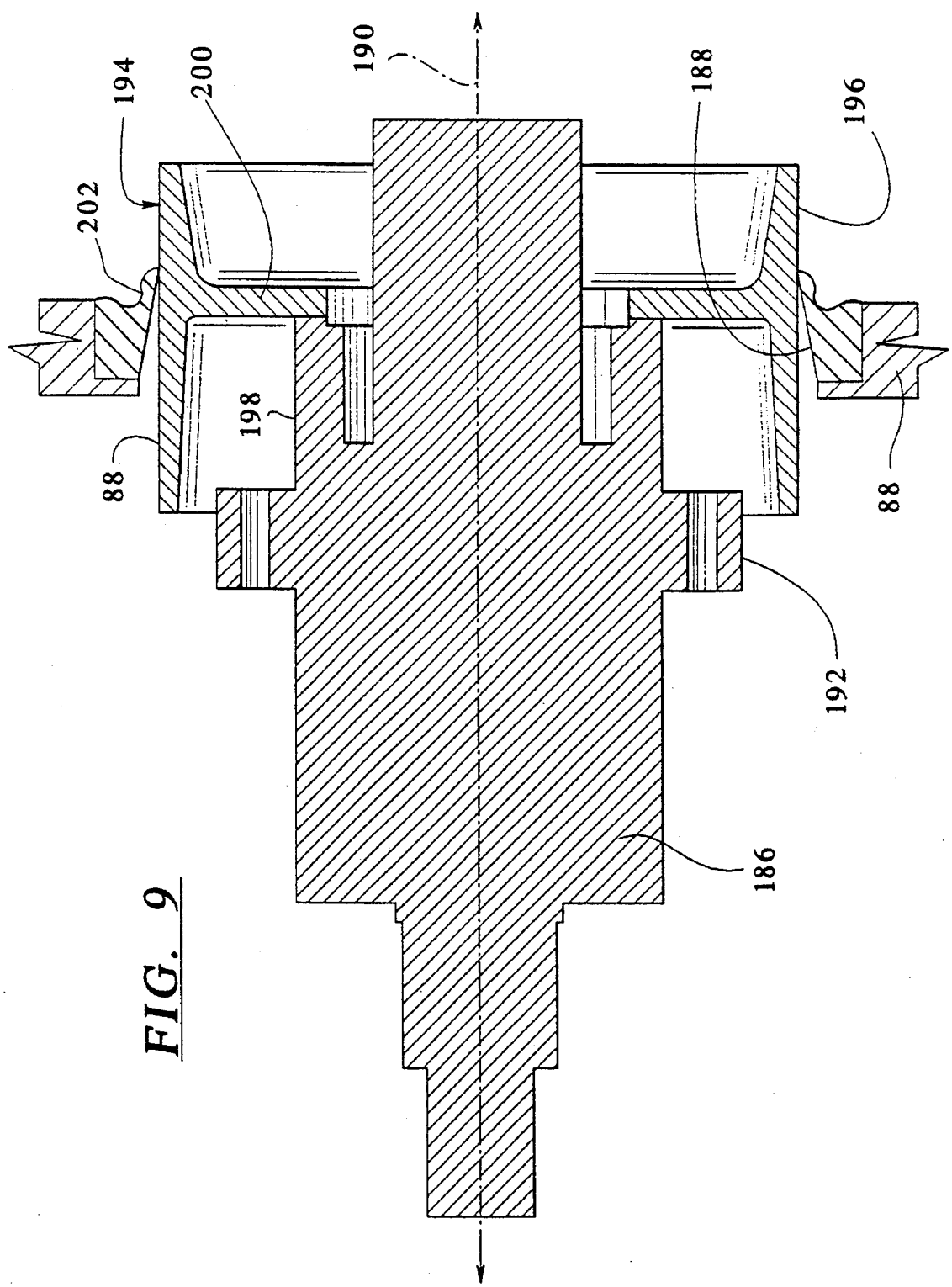
FIG. 9 is a section taken along line 9—9 of FIG. 1, showing how the hygienic and non-hygienic areas of the present machine are kept separate where the ultrasonic sealer penetrates the isolation wall.

Referring now to FIGS. 1 and 9, an arrangement is shown for sealing between the ultrasonically vibrating converter 186 and the isolation wall 88 which partitions the non-hygienic area (to the left of the wall 88 in FIG. 9) from the hygienic area (to the right of the wall 88 in FIG. 9). This area must be sealed because the converter 186, being attached to the sealing horn 112, also reciprocates between open and closed positions as the cradle 118 moves. It is important to keep foreign matter from being thrust either way through the isolation wall 88 by reciprocation and vibration of the converter 186.

The necessary barrier is obtained as illustrated in FIG. 9. The isolation wall 88 has an opening defined by a marginal edge 188. An ultrasonic converter 186 is disposed in the opening 188, and is reciprocated within the opening 188 along an axis 190 passing through the opening. The converter 186 is vibrated at an ultrasonic frequency by machinery disposed in the non-hygienic area.

The converter 186 has a null area or node 192 at which the converter is vibrated substantially minimally. (The ultrasonic waves are standing waves propagated along the axis 190, so the converter 186 has one or more nodes, each disposed substantially in a plane perpendicular to the axis 190, where the local amplitude of the vibrations is quite small relative to their maximum amplitude.)

A generally cylindrical sealing surface 194 defined by a sleeve 196 is fixed with respect to a first member which is one of the marginal edge and the null area. Here, the sleeve 196 is fixed to a forwardly projecting skirt 198 which depends from the null area 192. The skirt effectively projects the null area forward, which is important so that the converter does not transmit substantial ultrasonic energy to the sleeve 196, which could damage or melt the seal described below.

The sealing surface 194 faces a second member which is the other of the marginal edge and the null area (and here is the marginal edge 188 defining the opening in the wall 88).

The web 200 of the sleeve 196 is joined, as by welding, to the skirt 198. The web 200 defines a barrier between the sealing surface 194 and the null area 192, which keeps foreign matter from passing through the sleeve 196. The seal between the converter 186 and the opening 188 is completed by a wiping seal 202 mounted to the opening 188, which wipes the generally cylindrical sealing surface 194 as the converter 186 is reciprocated.

It will be appreciated that the parts of the assembly can be rearranged. For example, the seal 202 can be mounted to the null area 192 and the sleeve can be mounted to the opening 188 to obtain the same effect.

Anvil Adjustment

Figure 10:
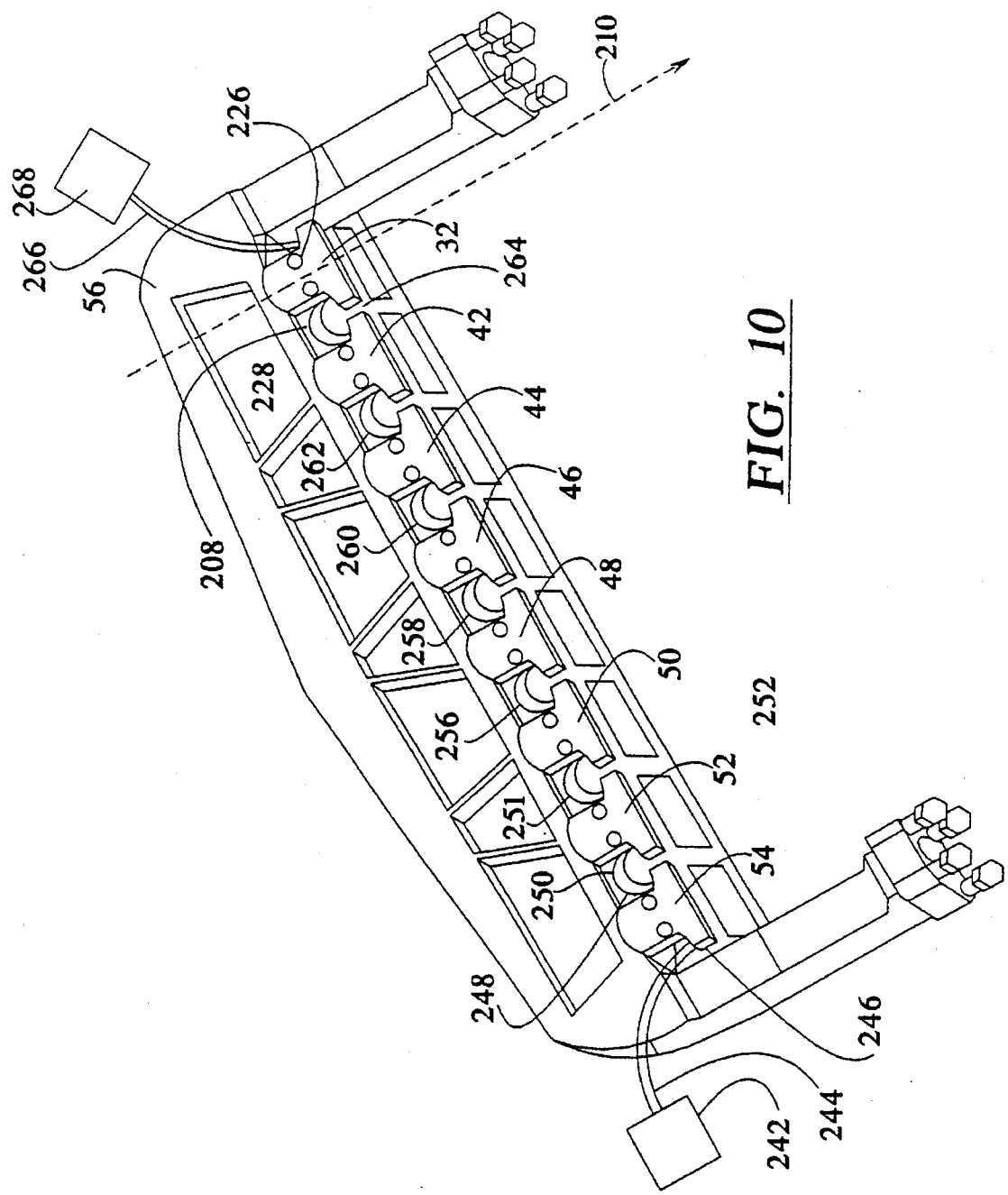
FIG. 10 is a more detailed perspective view, in isolation, of the anvil bar of FIG. 1.
Figure 11:
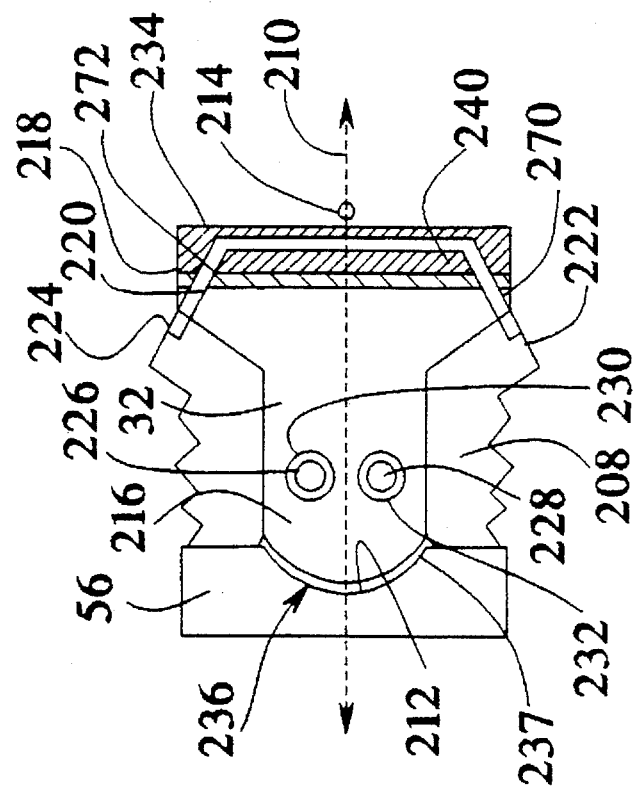
FIG. 11 is a section, taken parallel to one of its major side faces, of one of the anvils shown in FIG. 10.

FIGS. 1, 10, and 11 show certain advantageous details of the anvils 32 and 42–54 and their mounting on the anvil bar 56. Each anvil is connected identically, so only the anvil 32 and its mounting will be described.

The anvil 32 is received by a backing element—here, the anvil bar 56 extending substantially perpendicular to the axis 210—which is adapted to move generally along the axis 210 between an open and a closed position relative to the transducer or sealing horn 34 (shown in FIG. 7), as was previously described. The anvil bar has a flat mounting surface 208 to which the anvils such as 32 are bolted.

The anvil bar 56 has a cylindrically curved front surface 212 which is opposed to the corresponding transducer 34 and defines an arc of a circle having a center of curvature 214 and lying generally in a plane (here, the plane of the paper for FIG. 11) defined by the axis 210. This plane is chosen because there is a need to pivotally adjust the anvil 32 in that plane. The circle defining the adjusting plane can also lie in a plane which intersects the plane of the paper in FIG. 11, if adjustments in other planes are desired. Alternately, the curved surface 212 can be a spherically curved surface which would allow universal adjustment of the orientation of the anvil 32 about the center 214. The surface 212 is shown as a concave surface, but it could also be a convex surface.

Referring in particular to FIG. 11, the anvil assembly 32 includes an anvil pad 216, a facing member 218, a resilient pad 220, and tubing couplers 222 and 224, which are all joined together in a suitable manner. Fastening screws 226 and 228 are received in fastening holes 230 and 232 to normally clamp the anvil assembly 32 to the mounting surface 208.

Figure 7:
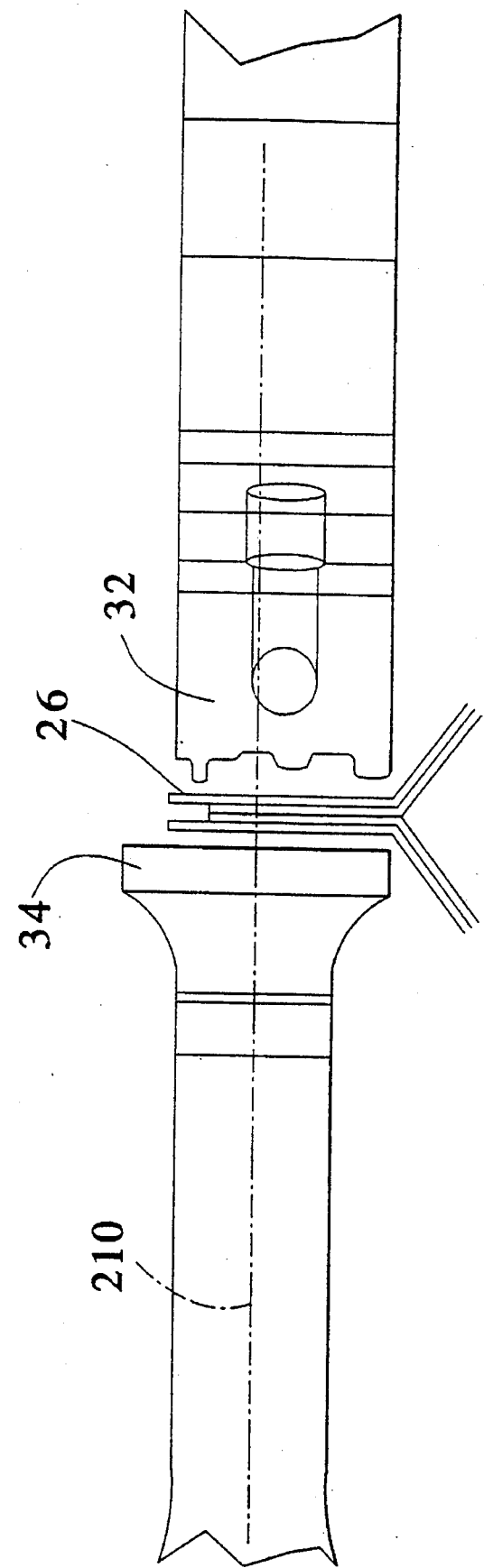
FIG. 7 is a view similar to FIG. 6, showing the anvil and sealing horn in their open positions with a gable closure located between them at a closure sealing position.

The anvil assembly 32 has a complexly shaped front surface 234, better shown in FIGS. 7 and 8, for contacting a workpiece and a curved back surface 236 which is substantially complementary to and normally bears against the curved front surface 212. As used in this description, a "complementary" pair of surfaces are a convex and concave surface which have substantially a common center of curvature and define circles lying in the same plane.

The fastening holes 230 and 232 are substantially larger than the shafts of the fastening screws 226 and 228 they receive, but smaller than the heads of the fastening screws 226 and 228. The heads alternatively can be smaller and washers can be inserted between the fastening screw heads and the portion of the anvil pad 216 against which the heads of the fastening screws 226 and 228 would otherwise directly bear. The substantially greater size of the fastening holes 230 and 232 relative to the fastening screws 226 and 228, best seen in FIG. 11, allows the anvil 32 to rock about the center 214 at least as much as one might wish to adjust the orientation of the anvil 32 relative to the anvil bar 56.

The fastening screws 226 and 228 are threaded into corresponding threaded holes in the mounting surface 208. Alternatively, the screws 226 and 228 could pass through larger holes in the mounting surface 208 and be threaded into correspondingly threaded holes in the anvil pad 216.

The fastening screws 226 and 228 have securing positions for fixing the anvil pad 216 and the anvil bar 56 together, which are reached by threading the screws 226 and 228 far enough into the mounting surface 208 to clamp the anvil pad 216 to the mounting surface 208. The fastening screws 226 and 228 have an adjusting position for allowing the anvil pad to rotate about the center 214 relative to the anvil bar 56 for aligning the anvil 32 with respect to the sealing horn 34 (FIG. 1). The adjusting position is reached by loosening the screws 226 and 228 sufficiently that the anvil pad 216 can rock with respect to the mounting surface 208. FIG. 10 illustrates that the anvils 32 and 42–54 are independently mounted to the mounting surface 208 as previously described, so they can independently rock about their respective centers of curvature, such as the center 214 for the anvil pad 216.

Figure 6:
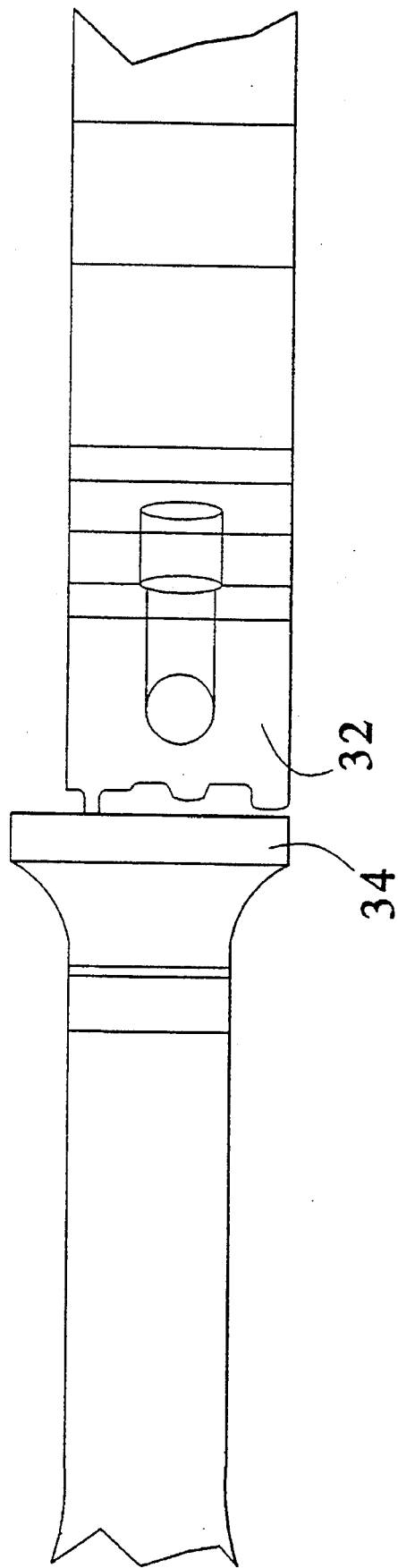
FIG. 6 is a schematic elevational view, taken from the perspective of section line 6—6 of FIG. 1, of one anvil and sealing horn abutting at a closure sealing position.

Referring now to FIGS. 6–8 and 11, the anvils such as 32 and transducers such as 34 of the ultrasonic sealing apparatus 20 can be aligned easily before beginning a production run. The fasteners such as 226 and 228 for all of the anvils 32 and 42–54 are first backed out to their adjusting positions. Next, if desired, the nominal contact positions of the anvils such as 32 and sealing horns such as 34 can be established by closing them together with light pressure so that they contact at the nominal closing position, as illustrated in FIG. 6. The contact between the sealing horns such as 34 and anvils such as 32 causes the anvils such as 32 to shift about their centers such as 214, thus orienting the anvils such as 32 into precisely parallel positions relative to the corresponding sealing horns such as 34. The fasteners can then be advanced to their securing positions to hold the adjustment. Once the nominal orientation of the anvils has been established, the anvils and transducers can be parted.

After, or instead of, performing the adjustment of the anvils such as 32 about their centers such as 214 with light closing pressure and without any cartons present, gauges representing workpieces to be clamped (which can simply be the top fins 26 or bottom fins 28 of cartons of the type which will next be run) can be inserted between each anvil such as 32 and transducer such as 34, as in FIG. 7. The fasteners such as 226 and 228 can be (or remain) backed out. The gauges 26 or 28 can be clamped between the anvils such as 32 and transducers or sealing horns such as 34 using the full sealing pressure which is intended to be exerted during the production run, as shown in FIG. 8. The closing force will urge any of the anvil pads such as 216 which are out of alignment to realign themselves by shifting about their centers such as 214. The fasteners such as 226 and 228 can then be advanced to their securing positions to hold the adjustment. A shim 237 may be disposed between surfaces 212 and 236 to provide lateral adjustment.

Anvil Cooling Apparatus

The anvils receive some of the ultrasonic energy from the transducers or sealing horns when cartons are sealed. To prevent the anvils from heating excessively, the anvils can be cooled. To this end, cooling water can be directed through the anvils to cool them. Referring to FIGS. 10 and 11, each anvil such as 32 has an internal water passage 240 connecting its input and output nipples 222 and 224.

FIG. 10 illustrates that water is taken from a water supply 242, which can be a municipal water supply. The water optionally may be sanitized so it cannot contaminate the hygienic part of the machine in the event of a leak. Water from the supply 242 is carded to the anvil 54 via a flexible tube 244. The tube 244 is sufficiently long and laid out in such a manner that reciprocation of the anvil bar 56 can be accommodated.

The tube 244 is fitted on the nipple 246 to pass cooling water into the internal passages of the anvil 54. The cooling water leaves the outlet nipple 248 of the anvil 54 via a bridge tube 250, which then directs the water to the inlet nipple 252 of the next anvil in line, here the anvil 52. A similar series of bridge tubes 254–264 transmits the cooling water through each of the anvils in turn.

Finally, an outlet tube 266 transfers the cooling water from the last anvil in line (32) to a drain 268. The outlet tube 266 is a flexible tube which is sufficiently long and laid out in such a manner that reciprocation of the anvil bar 56 can be accommodated. Of course, the drain 268 can be omitted and the water can be cooled and recycled to the source 242 if that is desired, and particularly if the water has been treated with relatively expensive sanitizing agents which are desirably recycled.

Several adaptations of the present cooling system are illustrated in FIG. 11. The resilient pad 220, typically made of rubber, ultrasonically and thermally isolates the anvil facing member 218 from the anvil pad 216. Because the facing member 218 is isolated, the cooling system can be limited to the facing member 218.

Also, to prevent the external tubing and fittings from being damaged or working loose, they are all mounted on the anvil pads 32 behind the resilient pad 220. The tubing and fittings themselves are therefore isolated from the ultrasonic energy. The internal water passage 240 itself has a portion 270 which passes through the resilient pad 220, directing water from an inlet nipple 222 behind the pad 220 to a cooling area in front of the pad 220. The internal water passage 240 has another portion 272 which passes through the resilient pad 220 and goes to the outlet nipple 224 behind the pad 220. The resilient pad 220 acts as a gasket between the pad 216 and facing member 218.

Use Of The Apparatus

The foregoing described apparatus can be used in a packaging machine such as the one disclosed in U.S. Ser. No. 08/190,546, filed Feb. 2, 1994, now U.S. Pat. No. 5,488,812 which is hereby incorporated by reference. The apparatus can be driven using a servomotor and associated control system such as is illustrated in U.S. Ser. No. 08/385,414, (Attorney Docket No. 10623US01; Corporate Docket No. TRX-0126), entitled "Control System for a Packaging Machine", filed on even date herewith, which is likewise incorporated by reference.

Figure 15:
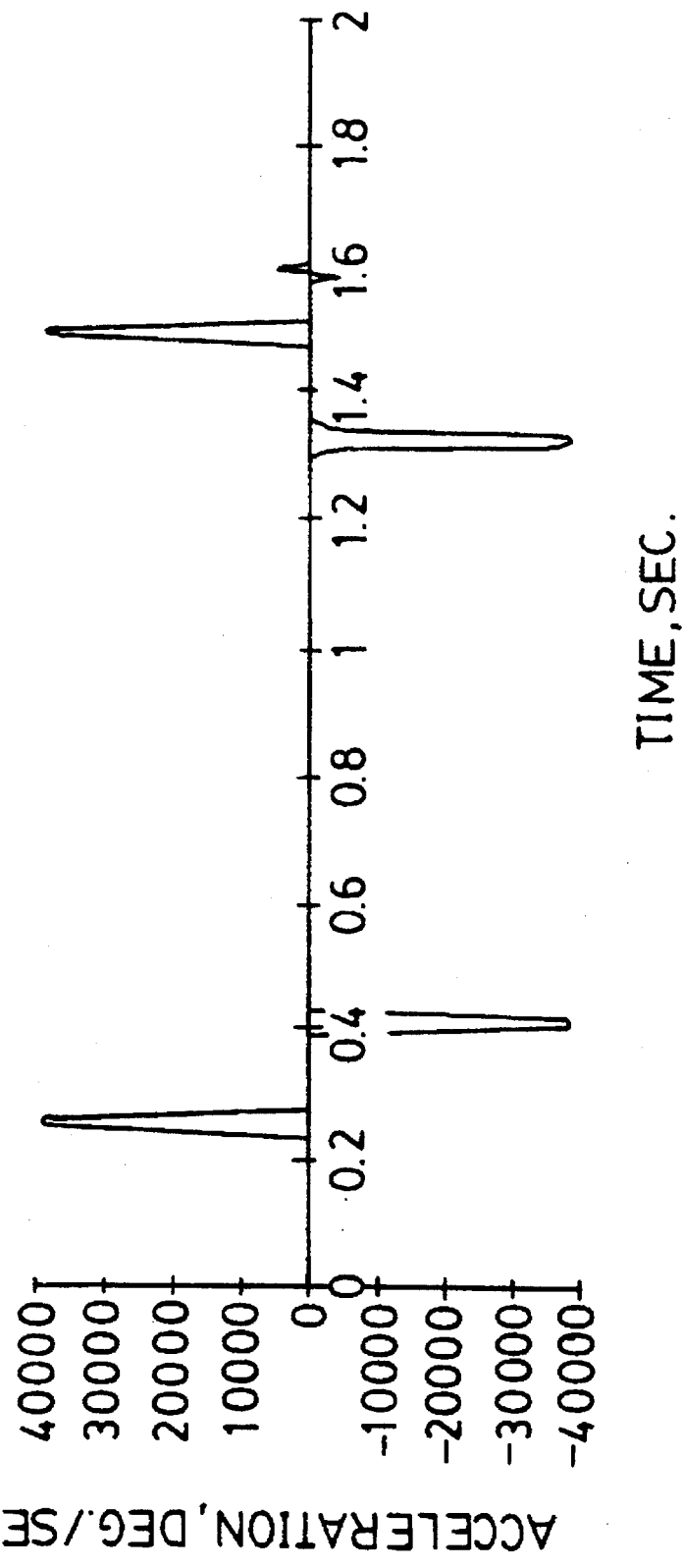
Figure 16:
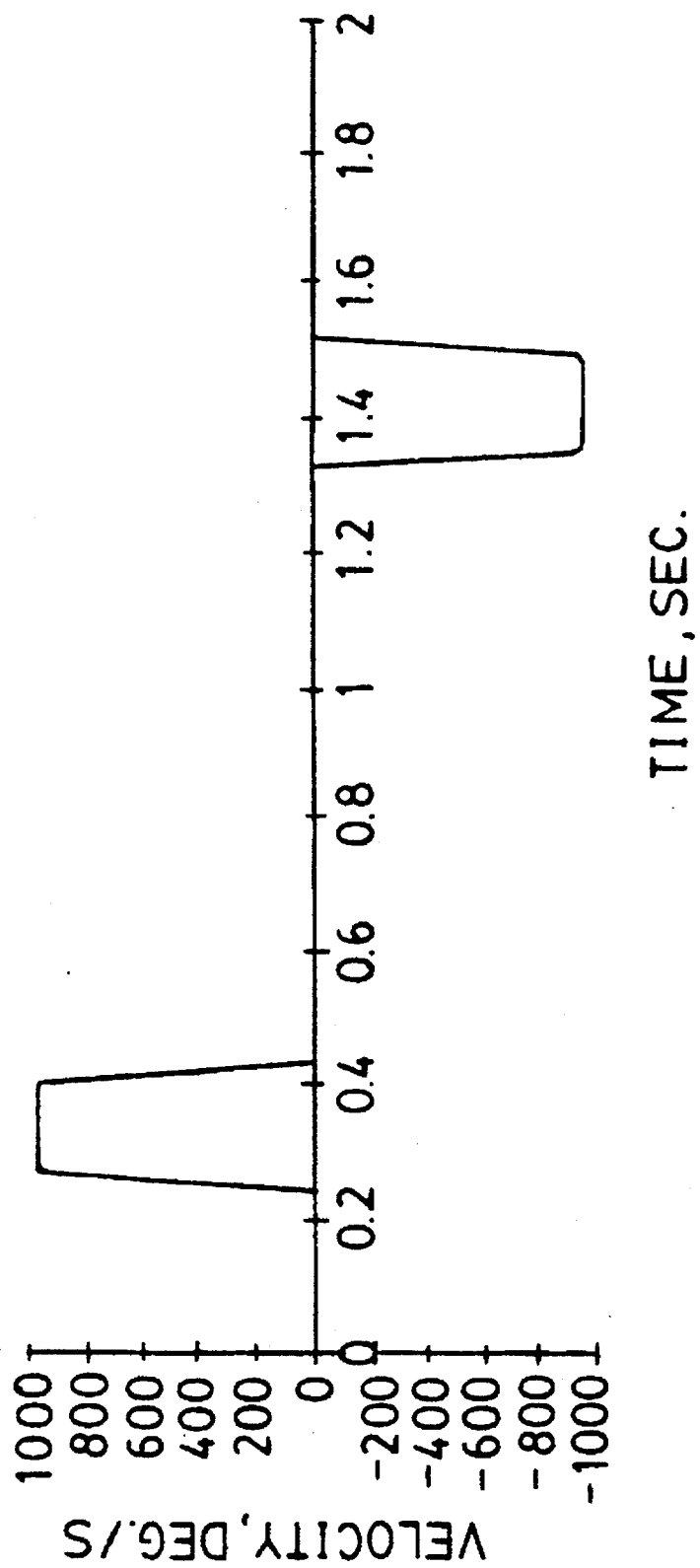

When the ultrasonic sealer is used to seal the bottom of a gable top carton in a packaging machine such as is disclosed in the '812 patent, it can be controlled using the control system illustrated in the U.S. Ser. No. 08/385,414 (Attorney Docket No. 10623US01; Corporate Docket No. TRX-0126) which may implement the motion profile illustrated in FIGS. 15–17 of this application. FIGS. 15–17 illustrate exemplary acceleration, velocity, and position profiles for a single sealing cycle.

The motion profile may include two moves. The first motor move, which occurs between about 0.2 sec. and 0.6 sec. into the cycle, rotates the cams to close the sealing jaws. The first motor move begins with a lead time sufficient to ensure that jaws make contact with the carton bottoms just after the carton bottoms arrive in the plane of the jaws. The second motor move, which occurs between about 1.3 and about 1.6 sec. into the cycle, rotates the cams so that the sealing jaws open. For each move, 15% of the move time is spent accelerating, 70% of the move time is spent at constant velocity, and 15% of the move time is spent decelerating. The cams are shaped to move the jaws during the constant velocity portion of the move thus avoiding the possibility of adding the torque required to move the jaws to the torque required to accelerate the cams.

Each move of this profile is basically a 15%, 70%, 15% trapezoidal velocity profile. However, during the time of any acceleration (or deceleration) 20% of the acceleration time is spent ramping up to constant acceleration and 20% of the acceleration time is spent ramping down to zero acceleration. The ramping of accelerations assists in preventing jerking of the mechanism.

Figure 12:
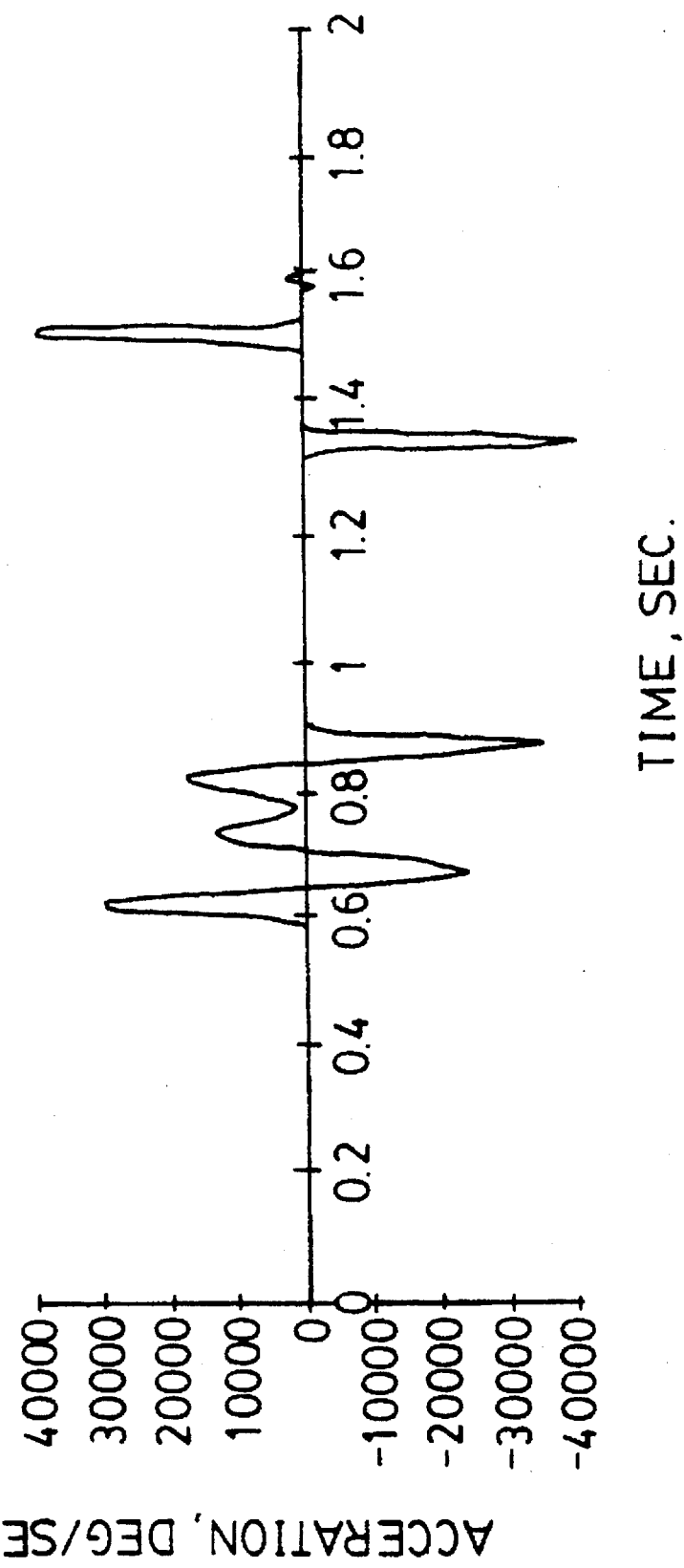
FIGS. 12, 13, and 14 respectively are plots of the acceleration, velocity, and position of the cam drive according to the embodiment of FIGS. 1–11, each versus time, for sealing the top seal of a gable top carton.
Figure 13:
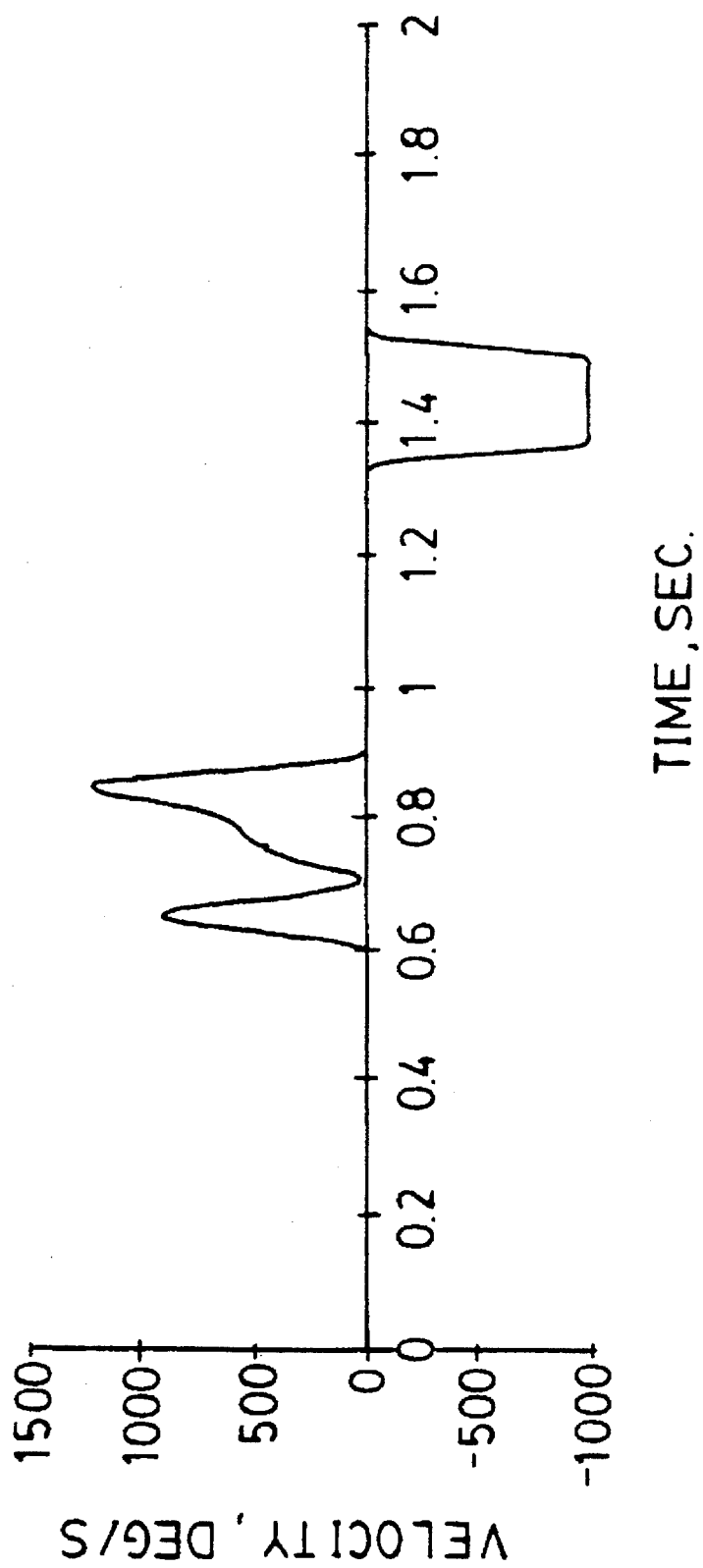
Figure 14:
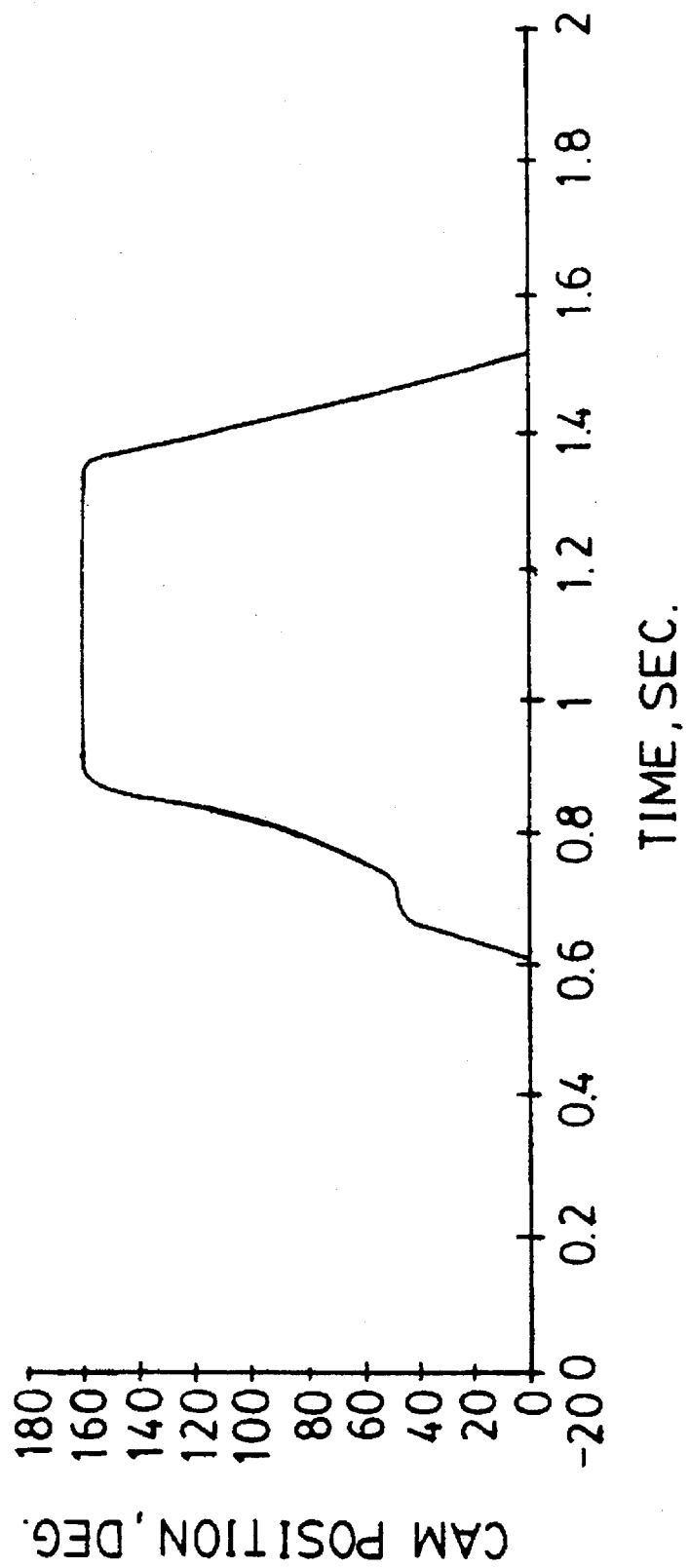

When the ultrasonic sealing press is used as a top sealer, it may be moved in accordance with the motion profiles illustrated in FIGS. 12–14. The motion may proceed in accordance with two moves.

The first move is an atypical move consisting of three polynomial splines. The first spline, which acts between about 0.6 and 0.7 see into the cycle, rotates the cams so that the jaws make contact with the top sealing areas of the carton generally simultaneously with the arrival of the cartons in the plane of the jaws. The cams arrive at that point with a very low velocity. The low cam velocity was desired so that the jaw velocities would be small enough to give refold mechanisms, such as those illustrated in U.S. Ser. No. 08/315,400, U.S. Pat. No. 5,518,578 (Attorney Docket No. 10455US01—Corporate Docket No. TRX-0047), entitled "Apparatus for Sealing the Fin of a Gabled Carton", filed on even date herewith, time to shape the carton tops for proper folding and sealing. At the same time it is desirable to have some velocity greater than zero so that the subsequent acceleration could be done without having to overcome static friction.

The second spline of the move, which acts between about 0.7 sec. and 0.8 sec. into the cycle, rotates the cams until the jaws—and thus, the carton tops—are about 5 mm apart. It is desired that this move last 100 ms to continue giving time for action of the refold mechanisms and to allow excess air to escape the carton. It is also desired that the velocity at the end of the second spline be as low as possible while still enabling the jaws to finish closing in the next 100 ms via the third spline. The low velocity at the end of the second spline (and, thus, at the beginning of the third spline) is desirable to extend the time for air escapement to proceed as long into the third spline as possible.

The third spline, which acts between about 0.8 sec. and 0.9 sec. into the cycle, has to decelerate as fast as possible to complete the cam rotation and jaw closing in the allotted 100 ms.

The second move, which acts between about 1.3 sec. and 1.6 sec. into the cycle, opens the top sealer jaws and is the same as the move that opens the bottom sealer jaws. 15% of the move time is spent accelerating, 70% of the move time is spent at constant velocity, and 15% of the move time is spent decelerating. During the time of any acceleration (or deceleration) 20% of the time is spent ramping up to constant acceleration and 20% of the time is spent ramping down to zero acceleration. Again, the ramping of accelerations was implemented to reduce jerking of the mechanism.

The foregoing figures use units that are in deg, deg/s, and deg/s$^2$ of cam rotation instead of radius or degrees of motor rotation because motor rotation is directly proportional to cam rotation and because cam rotation is more meaningful to more people than motor rotation.

We claim as our invention:

1. An ultrasonic transducer assembly for hygienic ultrasonic sealing, comprising:

A. a hygienic sealing area and a non-hygienic area, separated by a first barrier having an opening defined by a marginal edge;

B. an ultrasonic converter disposed in said opening which is passed through said opening along an axis passing through said opening and is vibrated at an ultrasonic frequency by machinery disposed in said non-hygienic area, said converter having a null area at which said converter is vibrated substantially minimally;

C. a generally cylindrical surface for sealing the non-hygienic area from the hygienic sealing area, said generally cylindrical surface being fixed with respect to a first member which is one of said marginal edge and said null area, said sealing surface facing a second member which is the other of said marginal edge and said null area, said generally cylindrical surface being defined by a sleeve;

D. a second barrier defined by a web extending between said sleeve and said first member; and E. a seal mounted to said second member and wiping said generally cylindrical sealing surface as said converter is reciprocated.

2. The transducer assembly of claim 1, wherein said first member is said null area and said second member is said marginal edge.

3. The transducer assembly of claim 1, wherein said converter has a body and said null area includes a skin depending generally along said axis from said body.

4. An ultrasonic transducer assembly for hygienic ultrasonic sealing, comprising:

a hygienic sealing area and a non-hygienic area, separated by a first barrier having an opening defined by a marginal edge;

an ultrasonic converter disposed in said opening which is passed through said opening along an axis passing through said opening and is vibrated at an ultrasonic frequency by machinery disposed in said non-hygienic area, said converter having a null area at which said converter is vibrated substantially minimally;

a generally cylindrical surface for sealing said non-hygienic area from said hygienic sealing area, said generally cylindrical surface being defined by a sleeve that is fixed with respect to said null area, said converter having a body, said null area including a skirt depending generally along said axis from said body and connecting said null area to said generally cylindrical surface, said sealing surface facing said marginal edge; and a seal fixed with respect to said marginal edge and wiping said generally cylindrical surface as said converter is reciprocated.

5. The transducer assembly of claim 4, further comprising a second barrier defined by a web extending between said sleeve and said skirt.

6. An ultrasonic transducer assembly for hygienic ultrasonic sealing, comprising:

a hygienic sealing area and a non-hygienic area, separated by a first barrier having an opening defined by a marginal edge;

an ultrasonic converter having a sealing horn, the ultrasonic converter being disposed in said opening which is passed through said opening along an axis passing through said opening and is vibrated at an ultrasonic frequency by machinery disposed in said non-hygienic area, said converter having a null area at which said converter is vibrated substantially minimally, said converter being reciprocated with said horn from a first position in which the horn is disengaged from an object to be sealed to a second position in which the horn engages an object to be sealed;

a generally cylindrical surface for sealing said non-hygienic area from said hygienic sealing area, said generally cylindrical surface being fixed with respect to a first member which is one of said marginal edge and said null area, said sealing surface facing a second member which is the other of said marginal edge and said null area; and a seal mounted to said second member and wiping said generally cylindrical surface as said converter and horn are reciprocated between said first and second positions thereby inhibiting contamination of said hygienic area from said non-hygienic area.

7. The transducer assembly of claim 6, wherein said generally cylindrical surface is defined by a sleeve.

8. The transducer assembly of claim 7, further comprising a second barrier defined by a web extending between said sleeve and said first member.

9. The transducer assembly of claim 6, wherein said first member is said null area and said second member is said marginal edge.

10. The transducer assembly of claim 6, wherein said converter has a body and said null area includes a skirt depending generally along said axis from said body.

11. An ultrasonic transducer assembly for hygienic ultrasonic sealing, comprising:

a hygienic sealing area and a non-hygienic area, separated by a first barrier having an opening defined by a marginal edge;

an ultrasonic converter disposed in said opening which is passed through said opening along an axis passing through said opening and is vibrated at an ultrasonic frequency by machinery disposed in said non-hygienic area, said converter having a null area at which said converter is vibrated substantially minimally, said converter having a body and said null area including a skirt depending generally along said axis from said body;

a generally cylindrical surface for sealing said non-hygienic area from said hygienic sealing area, said generally cylindrical surface being fixed with respect to a first member which is one of said marginal edge and said skirt, said sealing surface facing a second member which is the other of said marginal edge and said skirt; and a seal mounted to said second member and wiping said generally cylindrical surface as said converter is reciprocated.

12. The transducer assembly of claim 11, wherein said generally cylindrical surface is defined by a sleeve.

13. The transducer assembly of claim 12, further comprising a second barrier defined by a web extending between said sleeve and said first member.

14. The transducer assembly of claim 11, wherein said first member is said null area and said second member is said marginal edge.

* * * * *

UNITED STATES PATENT AND TRADEMARK OFFICE
CERTIFICATE OF CORRECTION

PATENT NO. : 5,575,884

DATED : November 19, 1996

INVENTOR(S) : Stefan Annehed, Hisami Mitsuishi, Erik Schott, Dean C. Skonieczny, Par J. Svensson Page 1 of 3

It is certified that error appears in the above-indentified patent and that said Letters Patent is hereby corrected as shown below:

IN COLUMN 1, LINE 42

Cancel "pans" and insert --parts-- therefor.

IN COLUMN 3, LINE 1

Cancel "canon" and insert --carton-- therefor.

IN COLUMN 3, LINE 2

Cancel "scaling" and insert --sealing-- therefor.

IN COLUMN 3, LINE 9

Cancel "canon" and insert --carton-- therefor.

IN COLUMN 3, LINE 12

Cancel "canon" and insert --carton-- therefor.

IN COLUMN 3, LINE 13

Cancel "canon" and insert --carton-- therefor.

IN COLUMN 3, LINE 15

Cancel "canon" and insert --carton-- therefor.

IN COLUMN 3, LINE 16

Cancel "canon" and insert --carton-- therefor.

UNITED STATES PATENT AND TRADEMARK OFFICE
CERTIFICATE OF CORRECTION

PATENT NO. : 5,575,884
DATED : November 19, 1996
INVENTOR(S) : Stefan Annehed, Hisami Mitsuishi, Erik Schott, Dean C. Skonieczny, Par J. Svensson It is certified that error appears in the above-indentified patent and that said Letters Patent is hereby corrected as shown below:

IN COLUMN 3, LINE 19

Cancel "canon" and insert --carton-- therefor.

IN COLUMN 4, LINE 21

Cancel "beatings" and insert --bearings-- therefor.

IN COLUMN 4, LINE 22

Cancel "fight" and insert --right-- therefor.

IN COLUMN 4, LINE 48

Cancel "carded" and insert --carried-- therefor.

IN COLUMN 4, LINE 49

Cancel "beatings" and insert --bearings-- therefor.

IN COLUMN 5, LINE 17

Cancel "scaled" and insert --sealed-- therefor.

IN COLUMN 6, LINE 52

Cancel "fight" and insert --right-- therefor.

IN COLUMN 8, LINE 17

Cancel "are" and insert --arc-- therefor.

UNITED STATES PATENT AND TRADEMARK OFFICE
CERTIFICATE OF CORRECTION

PATENT NO. : 5,575,884
DATED : November 19, 1996
INVENTOR(S) : Stefan Annehed, Hisami Mitsuishi, Erik Schott, Dean C. Skonieczny, Par J. Svensson It is certified that error appears in the above-indentified patent and that said Letters Patent is hereby corrected as shown below:

IN COLUMN 9, LINE 57

Cancel "carded" and insert --carried-- therefor.

IN COLUMN 11, LINE 9

Cancel "see" and insert --sec-- therefor.

IN COLUMN 12, LINE 16

Cancel "skin" and insert --skirt-- therefor.

Signed and Sealed this

Twentieth Day of May, 1997

Attest:

BRUCE LEHMAN

Attesting Officer          Commissioner of Patents and Trademarks